Sept. 28, 1937.  B. M. SHALLER  2,094,221
AIR CONDITIONING DEVICE FOR MOTOR VEHICLES
Filed June 2, 1934  4 Sheets-Sheet 1
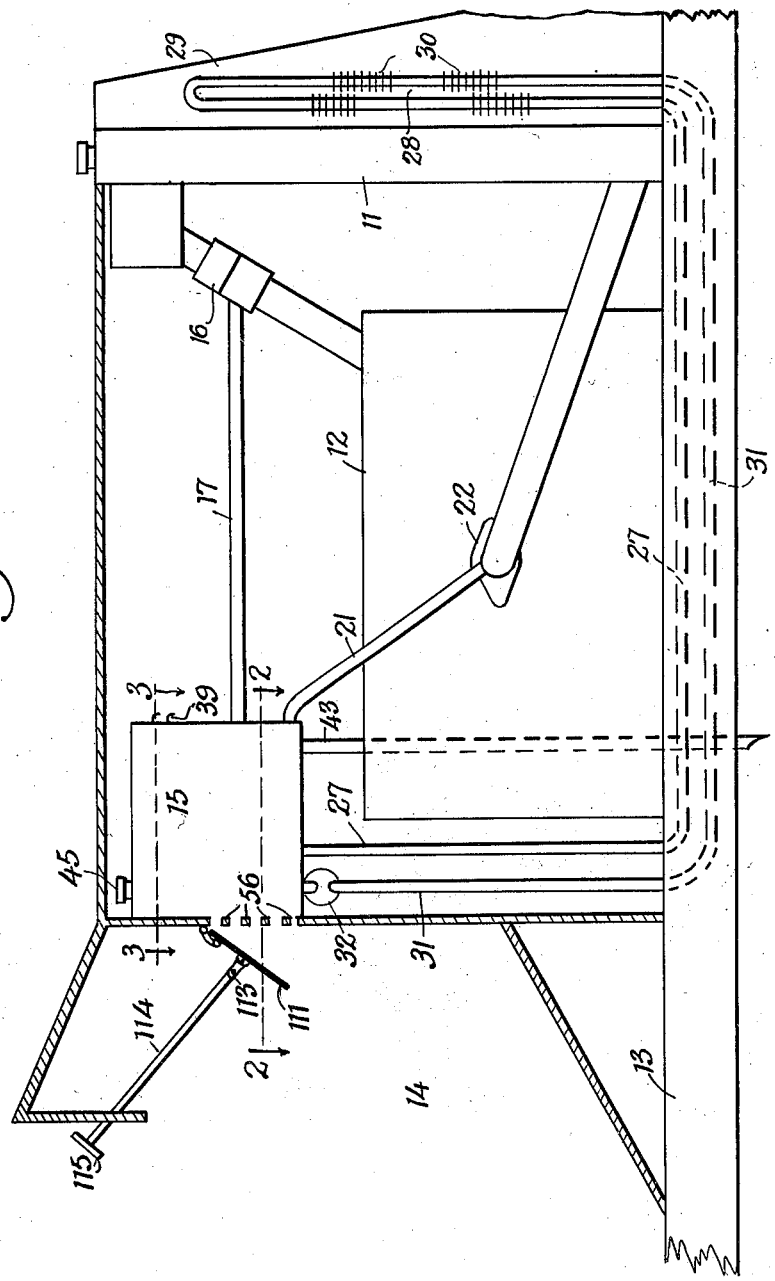
Inventor,
B. M. Shaller,
by John W Farley
Attorney.

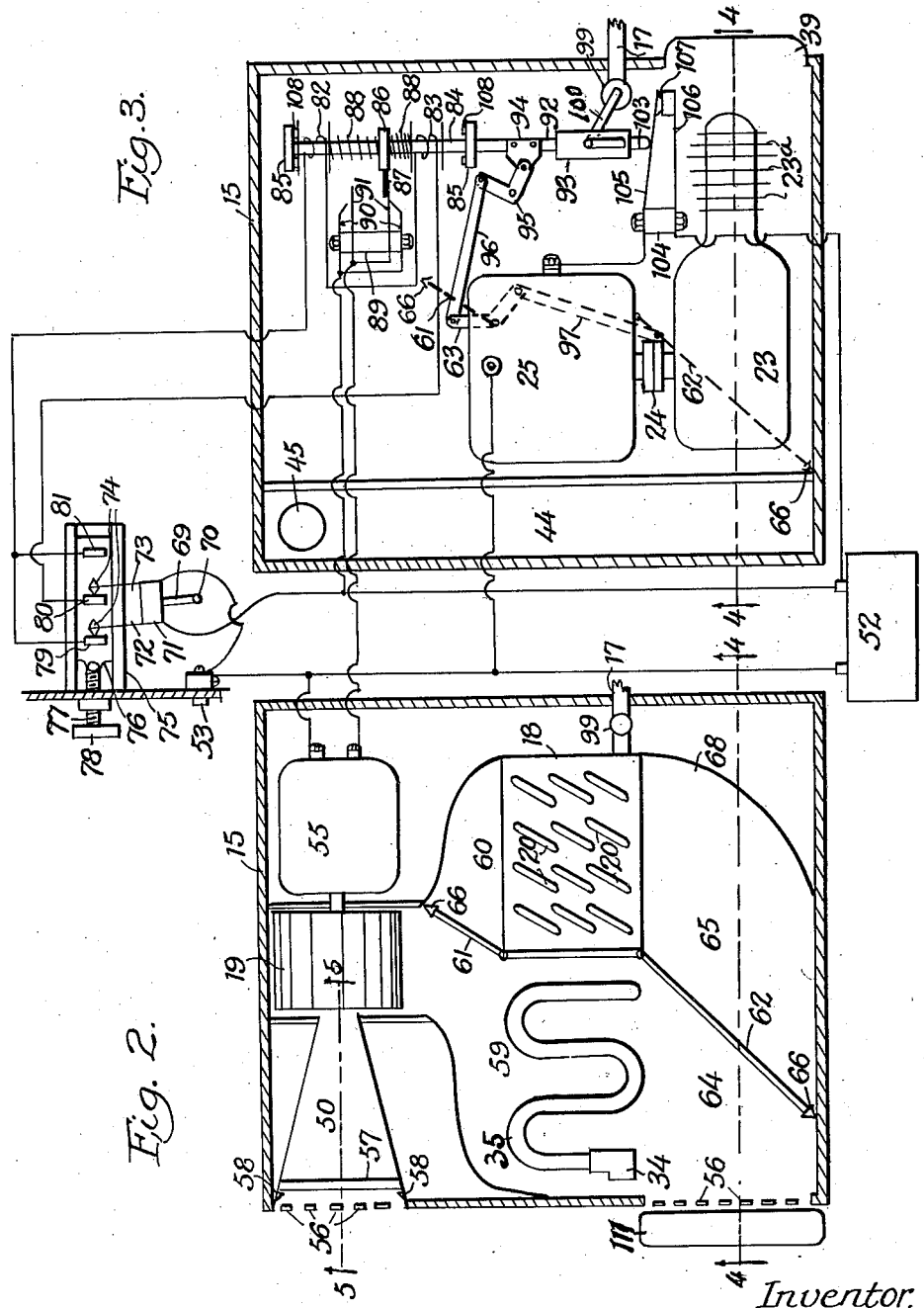

Sept. 28, 1937. B. M. SHALLER 2,094,221
AIR CONDITIONING DEVICE FOR MOTOR VEHICLES
Filed June 2, 1934 4 Sheets-Sheet 3
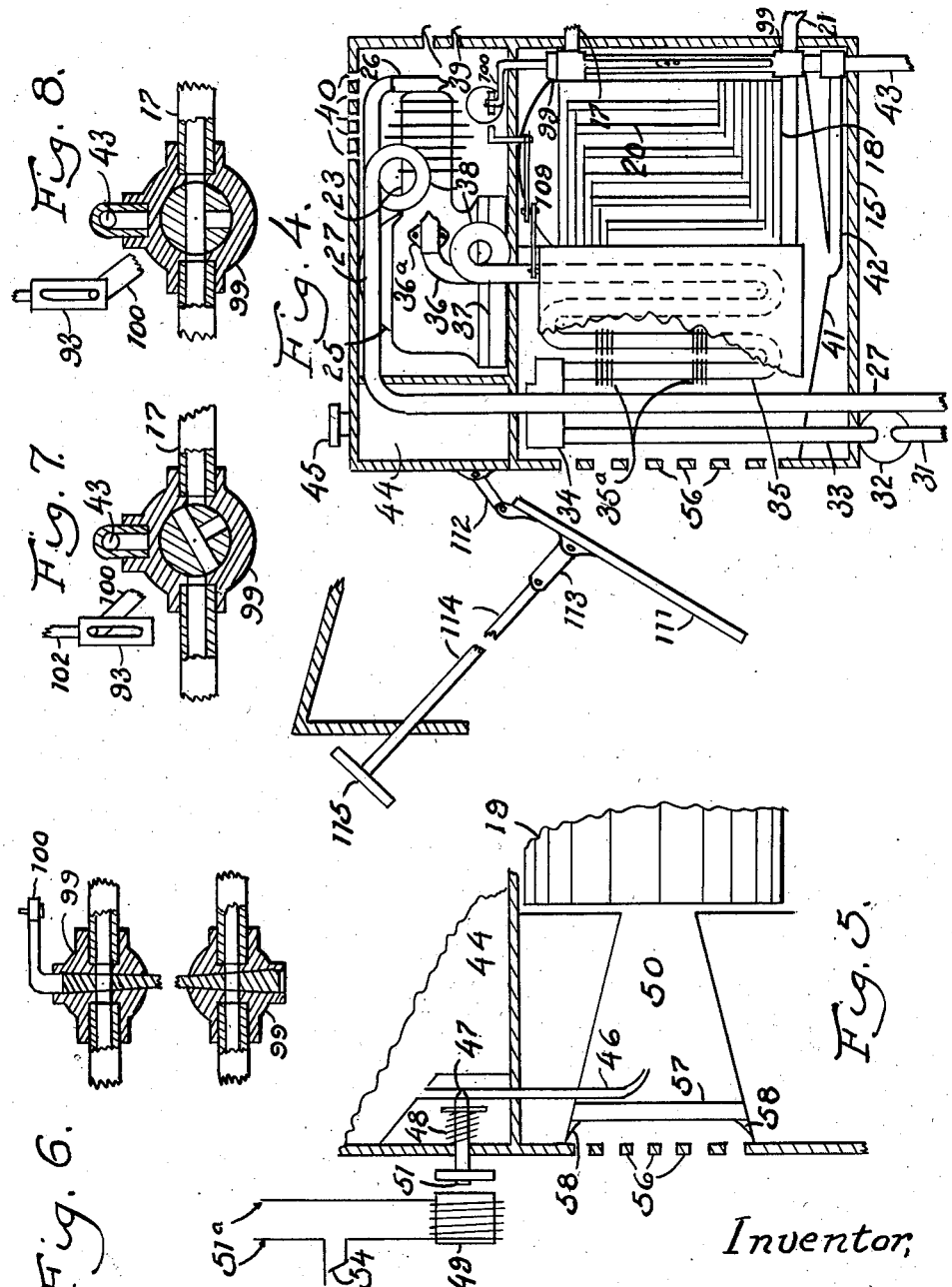
Inventor,
B. M. Shaller.
by John W Farley
Attorney.

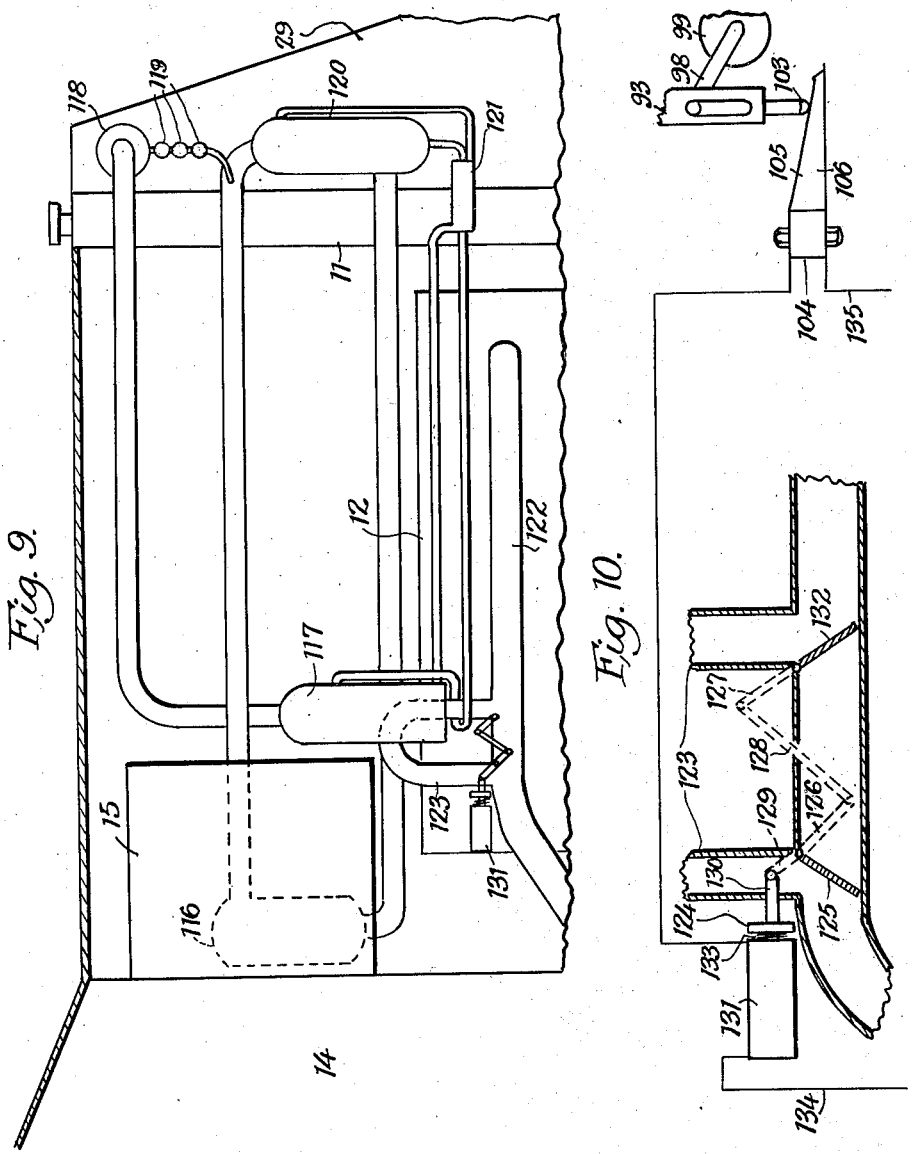

Patented Sept. 28, 1937

2,094,221

UNITED STATES PATENT OFFICE 2,094,221

AIR CONDITIONING DEVICE FOR MOTOR VEHICLES

Burns M. Shaller, Marion, Ark., assignor of one-fourth to Frank W. Dahn, Washington, D. C.

Application June 2, 1934, Serial No. 728,634

9 Claims. (Cl. 257—3)

My invention relates to an air conditioning device and more specifically to such a device adapted particularly for closed motor vehicles.

The primary object of my invention is to provide an apparatus of the character specified which may be used for both heating and cooling the air in the interior of the motor vehicle.

Another object of my invention is to provide the above mentioned apparatus with a means for regulating the humidity in the vehicle interior.

A further object of my invention is to provide automatic control for the heating, cooling and humidifying devices in order to maintain the desired temperature and humidity of the air in the car regardless of the variations of temperature and humidity of the outside air.

A still further object of my invention is to provide an air conditioning device of the character specified which is relatively simple and economical in construction, may be easily and readily installed and which is highly efficient and durable in use.

Other objects, some of them more or less ancillary or incidental to those above mentioned, will appear as the description proceeds.

The invention is hereinafter more fully described and claimed, and illustrated in the accompanying drawings, wherein:

Figure 1 is a side elevation, partly in section, illustrating the application of my invention to a motor vehicle;

Figure 2 is a plan view in section taken along line 2—2 of Figure 1 showing the air passageways;

Figure 3 is a plan view in section taken along line 3—3 of Figure 1 showing the control means and the mechanical cooling device;

Figure 4 is a side elevation in section taken along line 4—4 of Figures 2 and 3 showing the general arrangement of parts;

Figure 5 is a side elevation in section taken along line 5—5 of Figure 2 showing the humidifying device and its control;

Figure 6 is an enlarged sectional view of the double shut off valves used in my invention;

Figures 7 and 8 are enlarged sectional views of the double shut off valves of Figure 6 but with the valve in different operating positions;

Figure 9 shows a modified form of my invention in which an "absorption" system is used for cooling instead of the "compression" system described in the preceding figures, and Figure 10 is an enlarged sectional view through the exhaust pipe and bypass of Figure 9 showing the valves and control.

My invention is designed to produce a comfortable temperature and humidity at all times and at all seasons of the year in the interior of motor vehicles. The problem of air conditioning motor vehicles is a highly specialized one due to the limitations of space and power available. My invention solves all these difficulties in a highly desirable manner.

Referring more particularly to the drawings, and in which drawings, like parts are designated by like reference characters throughout the several views, the reference character 11 designates the radiator of a motor vehicle of any well known type, 12 designates the motor, 13 the frame and 14 the interior compartment.

In the carrying out of my invention, the heating, cooling and humidifying devices are all mounted within a single unit, designated by the reference character 15. This unit 15 is mounted preferably on the motor side of the vehicle's dash board just under the hood. This mounting utilizes space not required for other things in the vehicle, and is in a convenient location for the periodic inspection which may be required. It is to be understood that the unit 15 may be mounted in any other convenient location and still fall within the scope of my invention.

For convenience in understanding, the action of the component parts of my invention will be described individually under the headings—Heating, Cooling, Humidifying, and Control.

Heating

The hot water circulating in the engine of the motor vehicle is utilized to heat the interior compartment by means of my invention in the following manner. A thermostat 16 of any well known type is installed in the upper water connection between motor 12 and radiator 11. This thermostat retards the circulation of water through radiator 11 until the water reaches a predetermined temperature. Water passage 17 is installed on the motor side of the thermostat 16 and conveys the hot water from the motor to radiator 18 installed inside of unit 15. Under the influence of a current of air from fan 19, the water gives off its heat into the interior compartment 14, and in cooling, thermo-syphonally flows down through tubes 20 in radiator 18, returning through water passage 21 to lower water manifold 22 on the motor 12. Here the water is again heated by the motor and thus continues the cycle as described above. When the motor has warmed up sufficiently to open the thermostat 16, the hot water from the motor 12 circulates through the radiator 11 and is cooled by doing so. This normal cooling of the motor in no way affects the circulation of hot water through the radiator 18 in the device 15 as sufficient hot water passes through it to amply heat the interior compartment of the vehicle under all weather conditions.

Cooling

In the preferred embodiment of my invention, I make use of a cooling system commonly known as a "compression" refrigeration system which operates in a manner now to be described. Compressor 23 is shown with its axis horizontal, but it is to be understood that different requirements of mounting in different types of vehicles may necessitate change of position, location and type of drive. For convenience, it is shown as flexibly driven through universal coupling 24 by electric motor 25. This motor is connected to the car battery 52 by appropriate wiring and switching. The action of the compressor 23 forces the refrigerant through service valve 26 and tubing 27 to condenser coil 28 (see Figure 1). This condenser coil 28 is mounted between radiator 11 and radiator grill 29 or it may be incorporated in the grill-work 29 which acts as a beautifying screen or grill and is now used on many types of motor vehicles. If the condenser coil 28 is mounted between the radiator and the grill work, radiating discs or fins are installed on the tubing which forms this coil, and are sectionally shown and designated by the reference character 30. The refrigerant being forced through coil 28 is cooled by the passage of air over it and is condensed, flowing by way of tubing 31 to compression and storage tank 32, thence through tubing 33 to expansion valve 34 (see Figure 4). Under the action of expansion valve 34, the refrigerant vaporizes in coil 35 and returns to the vacuum side of the compressor 23 through tubing 36 and service valve 36a where it resumes the cycle just referred to. As the refrigerant vaporizes within coil 35, it absorbs heat, or as it is commonly described, it gives off cold, thus greatly reducing the temperature of the coil. In a manner similar to that used on condenser coil 28, expansion coil 35 may be also equipped with radiating discs or fins 35a to facilitate the absorption of heat (or radiation of cold) from the air being circulated over it by fan 19. Storage tank 32 is used to allow a wide margin in pressure during charging of the system, thereby making this adjustment not critical. Compressor 23 and electric motor 25 which drives it are yieldably mounted within unit 15 on rubber cushion 37 which absorbs the vibration of the compressor without transmitting it to the vehicle. Tubing 27 and 36 which connect the compressor with the other parts of the cooling device just referred to are formed in a helical coil before attachment to the compressor. These coils, designated by numeral 38, absorb the vibration from the compressor without transmitting it to the other parts of the cooling device and also preclude the possibility of breakage of the connecting tubing. Service valve 36a is installed for the purpose of charging the system. Compressor 23 is equipped with radiating fins 23a to properly cool it, air being drawn in through louvres 39. This air is heated by the compressor and liberated through openings 40 in unit container 15.

Humidifying

Two facts must be borne in mind in order to understand the purpose and action of the humidifying device. Generally speaking, in the United States during the summer, the humidity of the air is relatively high, this excess humidity causing "stickiness" or an uncomfortable feeling because the normal perspiration is not absorbed by the surrounding air. During the winter time, under the action of artificial heat through hot water heating, the normal humidity of the air is "dried up" and although the temperature of the surrounding air is high enough for comfort, there is a feeling of chilliness because of lack of humidity.

From a careful study of these two facts it is apparent that in order for a humidifying device to function properly, it must remove humidity from the air in summer time and add humidity to the air in winter when artificial heat is being used. These two conditions are automatically handled by the humidifying device in the following unique manner: In summer time when the humidity is too great, the circulation of air over expansion or cooling coil 35 results in a cooling of the air, and consequent condensation of the air's moisture on this coil by coming in contact with it. As this moisture condenses and forms drops of water, it falls into pan 41 placed under coil 35. This pan is in the form of a flat funnel, and the water dropping onto it is carried off through connecting pipe 42 to drain pipe 43, thence to the outside of the vehicle. From the above described action it will be noted that as the air circulates over the coil, the humidity is removed resulting in a dry, cold air which is better adapted to personal needs than air of relatively high humidity. During winter time under artificial hot water heat, humidity must be supplied to permit a comfortable atmosphere and the manner of accomplishing it will now be described. Unit 15 is provided with water storage tank 44 on the top of which is a filler opening and cap 45 for the purpose of easily filling up the tank. Reference to Figure 5 will show tube 46 opening into the tank 44 at a point slightly above the bottom of the tank. This prevents any accumulation of foreign matter in the water from entering the tube and being forced into the interior of the vehicle. This also permits, if desired, the addition of a small amount of lime to the tank without clogging passageway 46. This lime is used for removing the carbon dioxide from the air, or if desired the water may be slightly perfumed, or a deodorant may be added. Passage of water through tube 46 is under the control of needle valve 47, which under the action of spring 48 is normally held against its seat in tube 46, thereby preventing the passage of water from the tank. The head of needle valve 47 is composed of soft iron capable of being magnetized and attracted, under and only during the influence of an outside magnetic field. Electromagnet 49 is stationarily mounted in magnetic relation to needle valve 47, and under the influence of an electric current through the insulated winding around it produces a magnetic field which attracts needle valve 47 to it because of the soft iron head of the needle valve. This movement of needle valve 47 permits the passage of water by gravity from tank 44 through tube 46 into air passage 50 where, under the action of rotary fan 19 it is sucked in, atomized on striking the rapidly moving fan blades, and passes as vapor through the heating radiator 18 into the interior compartment of the vehicle. Tubes 20 in radiator 18 also act as eliminators for freeing the air from any entrained moisture. This moisture falls by gravity into pan 41, thence by pipe 42 to drain pipe 43. This action supplies the necessary humidity to the air, and continues as long as an electric current produces a magnetic field in magnet 49, the action of which attracts needle valve 47. The absence of electric current in magnet 49 dissipates its magnetism and needle valve 47 thereby loses its attraction and returns to its seat in passage 46 under the action of spring 48, thereby stopping the flow of water from tank 44 into passage 50. Mounted on the magnetic face of the head of needle valve 47 is pin 51, composed of a non-magnetic metal and provided for the purpose of introducing an air gap between the face of magnet 49 and the head of needle valve 47. This precludes the possibility of residual magnetism, holding the needle valve open. The electrical control wires 51a from magnet 49 are connected one to the storage battery 52 of the vehicle, and the other to the normally open side of control switch 53. This latter wire is cut through switch 54 which is under the control of any well known make of hygrostat (not shown).

Control

In order to properly understand the control of unit 15, a description of the passage of air through the two parts of the unit is necessary. The suction and propulsion of air is caused by rotary fan 19 driven by electric motor 55 at a high speed. Passageway 50 is shaped in the form of a Venturi tube, the larger end of which opens into the interior compartment of the vehicle, and is covered or protected by an ornamental grill 56. Just behind grill 56 is filter screen 57 which cleans the air being sucked into passageway 50. Screen 57 is held in position by two spring clips 58 which permit the screen to be easily removed for cleaning or for installation of a new screen. The small end of passage 50 opens at the center of rotary fan 19, which on revolving rapidly, creates a suction in passage 50. Thus the air being sucked in is thrown off the tips of the fan blades into passage 59 or passage 60 depending on the position of the movable shutter 61. Shutters 62 and 61 are interconnected through crank 63 rigidly mounted on shutter 61, and drag link 97, and are arranged so that when shutter 61 opens passage 59, shutter 62 is open to passage 64. When shutter 61 is closing passage 59, it opens passage 60, and shutter 62, through the mechanical connection just referred to, closes the passage 64 and permits a current of air to pass from passage 65 into the interior compartment of the vehicle over the ornamental grill 56. The edges of shutters 62 and 61 are covered with rubber 66 which permits their operation to be noiseless and also allows them to fit tight against the walls of the passageways. Between passages 59 and 64 is installed expansion or cooling coil 35, and between passages 60 and 65 is installed heating radiator 18. From this it can be readily seen that the air forced from the rotary fan 19 is either heated or cooled before being forced into the interior compartment of the vehicle, depending upon the positions of shutters 61 and 62. Passage 65 has baffle 68 placed in curved position as shown to deflect the current of air into the interior compartment of the vehicle. Water tubes 20 in radiator 18 are placed at an angle, as shown, to provide the utmost radiating surface to the air current passing over them. In this position they also act as miniature deflectors for the current of air passing over them.

The control of the unit is entirely automatic and it functions in the following manner. The electric control switch is mounted under the dash of the vehicle or in any other convenient position within the interior compartment. A thermostat of any well known make is connected to movable rod 69, movably mounted with point 70 as a fulcrum. Fastened to rod 69 is insulated block 71 on the edges of which are fingers 72 and 73. These fingers are tipped with small pieces of silver 74, or with any other well known metal used for electrical contact work. Mounted above and in relation to movable fingers 72 and 73 is block 75 which carries an insulated sliding piece 76. This sliding piece 76 is movable, its position being under the control of screw 77 connected to it by a ball and socket joint. On the outer end of screw 77 is knob 78, the turning of which moves sliding piece 76 to the right or left as desired. Rigidly mounted on insulating piece 76 are blocks 79, 80, and 81 made of silver or any other well known metal used for electrical contacts. When rod 69, under control of the thermostat moves to the left as shown, finger 73 makes contact against block 80 and finger 72 makes contact against block 79. With rod 69 under the control of the thermostat, moving to the right, finger 73 makes contact against block 81, and finger 72 makes contact against block 80. Finger 72 is electrically connected to the negative side of storage battery 52 and finger 73 is electrically connected through control switch 53 to the positive side of storage battery 52. Contact blocks 79 and 81 are electrically connected to each other and to one end of solenoid magnet 82. Contact block 80 is electrically connected to the other end of solenoid magnet 83. It will be seen from the description above that the switch is in reality a pole-changing device for the electricity from storage battery 52 and is under dual control. One control is the thermostat attached to rod 69 and the other control is manual through the medium of screw 77 and knob 78. It should also be noted that there is a space between contacts so arranged that there will be a variation of several degrees in the temperature of the air before contact fingers 72 and 73 move from their position on the right to the position on the left, this under the control of the thermostat. The relative positions of contact blocks 79, 80, and 81 on block 76 can be varied to suit the individual needs of the occupants of the motor vehicle, this movement, of course, changing the make and break positions of the contact fingers against the contact blocks. This absence of electrical current or the change in polarity of the electrical current through the control wires leading from switch to solenoid magnet, controls the entire operation of the heating or cooling devices. As stated under the heading of "Humidifying", the control of the humidifying device is electrically connected through switch 53 to the storage battery 52 of the vehicle. Switch 53 in the "off" position disconnects all of the air conditioning devices, while in the "on" position it controls the humidifying as well as the heating and cooling devices.

Solenoid magnet 82, obtaining its energy from the storage battery 53 through the pole-changing device just referred to, mechanically controls the heating and the cooling in a manner now to be described. Passing through solenoid magnet coils 82 and 83 is rod 84, a permanent magnet movably mounted so it may slide endways through magnet coils 82 and 83. On each end of rod 84 are permanently fastened steel washers 85 which tend to increase the magnetic attraction and repulsion created when an electric current passes through solenoid coils 82 and 83. Mounted on rod 84, midway between washers 85 is an insulated washer 86 carrying pin 87. Mounted around rod 84 between solenoid coils 82 and 83 and washer 86 are two expansion springs 88 which, when no current is flowing in the coils, hold rod 84 in its central position, and after a movement of rod 84 and after current has been cut off from the coils, return it to the central position. These springs bear against stationary coils 82 and 83 and washer 86 on movable rod 84. Mounted in relation to pin 87 on insulated washer 86 is switch 89 which carries the two fixed contacts 90 and the two movable contact fingers 91. The movement of plunger rod 84 to either of its extreme positions pushes a movable finger 91 against the related stationary finger 90 thereby making an electrical connection between these contacts. In the central position both contact fingers are open, breaking the electrical connection between these contacts. Connection from storage battery 52 through this switch 89 controls the operation of motor 55 which rotates fan 19. The tips of contact fingers 90 and 91 may be made of silver or any other metal used for electrical contact work. Fastened to one end of plunger rod 84 is rod 92 which carries pieces 93 and 94. Piece 94 is mechanically connected through crank 95, drag link 96 and crank 63 to shutter 61 which in turn is connected to shutter 62 through drag link 97. The operation of plunger rod 84 through the mechanical medium just referred to changes the relative positions of the shutters in the air passageways of this device, one position of the rod opening the passageway for cooling while the other position of the plunger rod opens the passageway for heating.

Piece 93 on the end of rod 92 is a strip with a slotted hole through which protrudes a pin or crank 100. By referring to Figures 6, 7 and 8, the operation of the double shut-off valves 99 may be understood. These T-valves 99 located at the top and bottom of radiator 18 serve as a means of connecting or disconnecting the radiator from the water system of the vehicle's motor and also as a means of draining this radiator should the occasion arise. With lever 100 in the position shown in Figure 8, pipes 21 and 17 are connected to radiator 18, and with lever 100 in the position shown in Figure 7, pipes 21 and 17 are disconnected from the radiator. The protruding pin in crank 100 may be slipped out and the crank turned so as to connect radiator 18 with drain pipe 43, thereby draining the radiator. The slot in block 93 is of such length as to allow rod 102 to make a half movement before moving crank 100. This is a desirable feature as slight fluctuations of the thermostat result in the operation of fan motor 55 and there is thus a resultant current of air over the radiator 18 and there is no necessity for closing this radiator's supply of hot water from the motor. It functions likewise to advantage during the cooling cycle. Here with crank 100 shutting off the radiator 18 from the hot water of the motor, slight fluctuations of the thermostat result only in the operation of the fan motor 55 and compression motor 25 and there is again no necessity for moving valve 100 to take care of the slight fluctuation.

On the extreme end of rod 93 is insulated piece 103 arranged in relation to motor switch 104 so as to compress contact 105 against contact 106 when plunger rod 92 is in its lower position. Storage battery 52 is connected to compression motor 25 through this switch 104. Contact points 107 on fingers 105 and 106 are made of carbon or any other well known material suitable for carrying the relatively large current required for operation of the motor 25. Steel washers 85 on the solenoid plunger 84 have non-magnetic stop pins 108 slightly protruding from their face. This is to preclude the possibility of residual magnetism holding the plunger in either position after current is cut off from coils 83.

The top of radiator 18 is curved to form an air dome 109. This air dome, or trap, allows for any undue expansion or contraction within the radiator thus eliminating the possibility of damage to the heating system.

Mounted within the interior compartment 14 of the vehicle and directly before air passage 64 is deflector 111 installed for the purpose of deflecting the heat or cold to any desired place. Its operation will now be described. Deflector 111 is flexibly connected to unit 15 through double ball and socket joint 112. Attached to the deflector is universal joint 113 on the end of which is rod 114 passing through the instrument panel of the vehicle and having attached to its end a knob 115. Pushing or pulling knob 115 moves the deflector 111 closer to or farther away from the air passage opening. Turning knob 115 to the right or left turns deflector 111 at an angle to the right or left, deflecting the air stream to any desired place.

Certain modifications may be made without departing from the scope or spirit of my invention. For example a tube may be added opening to the outside atmosphere allowing for the introduction of the outside air. Also if it is desired a conductor or conductors for the conditioned air may be installed for the purpose of delivering the air to various convenient locations within the vehicle. This latter feature would be particularly useful in the cases of busses where several different outlets for the conditioned air may be required.

Current consumption of this device will not be as excessive as it would appear at first. Compression motor 25 for the average car should be about $\frac{1}{15}$th H. P. with a drain of 12 amperes. In this connection, the refrigeration will only be required during the summer season when the days are long and the use of lights thus at a minimum. The fan motor 55 will have an average drain of about 3 amperes while the operation of both the solenoid magnets 82 and 83 and magnet 49 requires less than one ampere. To offset this current drain a slightly larger generator on the motor car would be advisable. This larger generator is now being adopted by some manufacturers.

Figure 9 shows a modified form of this invention in which the "absorption system" is used for cooling instead of the "compression system" as in the prior design. The unit 15 is not changed, but evaporator 116 is substituted for coil 35. Instead of compressor 23, generator 117 is used, being installed on the motor 12 utilizing the exhaust heat for operation thereof. Mounted between radiator 11 and radiator grill 29 are rectifier 118, condenser 119, absorber 120 and heat exchanger 121.

The unique feature in this modified form is the bypassed exhaust and the control therefor. Figure 10 is a section view through exhaust pipe 122 and by-pass 123 showing the valves and control. 132 and 125 designate valves inserted inside of exhaust pipe 122, hinged thereto at the top, and so interconnected by levers 126 and 127 and link 128 that they either both close by-pass 123 and allow gas to pass out of the exhaust pipe to muffler, or both open the by-pass for exhaust gas, necessitating it to go through by-pass 123 before going to the muffler. This passage being short and rounded offers no undue back pressure to the motor, and furnishes sufficient heat for the operation of generator 117. The operation of valves 132 and 125 is as follows. Rigidly attached to the protruding fulcrum of valve 125 is lever 129 on the end of which is flexibly pinned extension 130 of the plunger passing through the solenoid magnet 131 arranged in relation to it.

Rigidly mounted on plunger 130 is a soft iron washer or armature 124 held away from magnetic coil 131 by spring 133. This position (magnet not energized) holds valves 124 and 125 closed to by-pass 123 allowing no heated gases to pass through it, thereby producing no action in generator 117. Switch 104 and its control, piece 93 and insulated end 103 are the same switch and control as used in unit 15 of the original design, wires 134 and 135 going to the storage battery. With this switch in the closed position as shown, current passes through it to the insulated coil around solenoid magnet 131, energizing it, and attracting plunger 130 and washer 124 to it, overcoming the action of spring 133. This movement through the levers and link above described opens valves 132 and 125 to pipes 123, by-passing the hot exhaust gases through this pipe and heating it. This heat is enough to start the action of the liquid in generator 117 which through the well known process of the absorption system produces cold in the evaporator 116 installed in unit 15.

The distinct advantage of this modified form is the utilization of the wasted heat to produce cold in the interior of the vehicle. This modified form changes in no way the control, it remaining as before automatic, switch 104 operating the exhaust control valves instead of the compression motor.

While I have described the principle of the invention, together with the structure which I now consider the preferred embodiment thereof, it is to be understood that the structure shown is merely illustrative and that such changes may be made, when desired, as fall within the scope of the invention as claimed.

Having thus fully described my said invention, what I claim as new and desire to secure by Letters Patent is:

1. In an air conditioning system for motor vehicles, apparatus for increasing the humidity of the air in the interior of the motor vehicle, said apparatus comprising a water tank having a cap, a tube joined to the bottom of said tank, an electro-magnetically operated needle valve controlling the flow of water through said tube, said tube conducting the water from said tank to an air passage and a fan for atomizing the water in said air passage and passing it as vapor to the interior compartment of said vehicle, and thermostatically controlled means for operating said fan and said valve.

2. Apparatus for heating and humidifying the atmosphere in the interior of a motor vehicle comprising a water passage from the radiator of the vehicle to a second radiator, a return path from said second radiator to the radiator of the vehicle, a water tank having a cap, a tube connecting said tank to an air passage to permit water to flow by gravity from said tank to said air passage, a fan in proximity to said air passage whereby the water from said tank is atomized and blown through said second radiator causing warm, humidified air to be conducted to the interior of the vehicle, thermostatic means for controlling said heating means and said fan, and hygrostatic means for controlling the flow of water.

3. Apparatus for heating and humidifying the atmosphere in the interior of a motor vehicle comprising a heating means including a water passage from the radiator of the vehicle to a second radiator, with a return circuit to the radiator of the vehicle said water passage being connected to the radiator of the vehicle, a water tank, means for atomizing water from said water tank and passing the vapor through said second radiator into the interior of the vehicle, and means for controlling said heating and vaporizing means through a single controlling element.

4. In an air conditioning system for motor vehicles, an axially moveable rod operated by solenoids, the direction of said movement being subject to the action of a pole changing device, said pole changing device being subject to manual as well as thermostatic control, said rod moving in one position to control a heating system for the interior of the vehicle and moving in the opposite direction to control a cooling system for said interior.

5. A device as in claim 4, including a fan, and means to start the fan when the rod approaches either of its extreme positions.

6. In an air conditioning system for motor vehicles, a water passage from the radiator of said vehicle to a second radiator, the flow of water through said passage being controlled by T-valves by means of which the passage may be cut off from the radiator of said vehicle, a moveable rod controlling said T-valves through a lost motion crank connection, said moveable rod being operated automatically by thermostatic means and a removable pin on said crank whereby upon removal of said pin said valves may be positioned to drain the radiator.

7. In an air conditioning unit for motor vehicles, an air inlet opening, an electric motor operated fan for adjacent said opening, said fan sucking air through the inlet to air passageways, one passageway containing a cooling coil and the other a heating radiator, shutter means for defining the desired passageway, an axially movable rod controlling said shutter means and also the operation of said cooling coil and said heating radiator, automatic means operated in accordance with outside temperature conditions for actuating said rod, means for changing the humidity of the air in said passageway as desired, an opening for exhausting the conditioned air into the interior of the vehicle, and a deflector for casting the conditioned air into any desired portion of the interior.

8. In an air-conditioning device, heating means including a radiator, means for supplying heating fluid to said radiator, cooling means, means for supplying cooling fluid thereto, a fan arranged to circulate air over either of said heating and cooling means, common means to set in action either of said heating and cooling means and simultaneously to render said fan active, and lost-motion means between said common means and the means for supplying heating fluid whereby the fan may be started without affecting the heating means.

9. In an air-conditioning device, heating means, cooling means, a fan, means for causing air from said fan to pass alternatively over either one of said means and thence to a space containing air to be conditioned, including a pair of gates, interconnected means for moving said gates and for starting said fan in either of the extreme positions of the gates means for supplying cooling fluid to said cooling means, means for supplying heating fluid to said heating means, said interconnected means also controlling the supply of heating and cooling fluids, and a lost motion connection in the connections to the control for the heating fluid, whereby slight fluctuations in temperature do not affect said control.

BURNS M. SHALLER.